(12) United States Patent
Counterman

(10) Patent No.: US 6,577,595 B1
(45) Date of Patent: Jun. 10, 2003

(54) SYSTEMS AND METHODS FOR TRANSPORTING ASSOCIATED DATA SIGNALS OVER A NETWORK

(75) Inventor: Raymond C. Counterman, Canton, MA (US)

(73) Assignees: Genuity Inc., Burlington, MA (US); Verizon Corporate Services Group Inc., New York, NY (US)

(*) Notice: Subject to any disclaimer, the term of this patent is extended or adjusted under 35 U.S.C. 154(b) by 0 days.

(21) Appl. No.: 09/438,914

(22) Filed: Nov. 12, 1999

(51) Int. Cl.[7] .............................. H04J 3/14; H04L 12/56
(52) U.S. Cl. ................. 370/230; 370/235; 370/395.21; 370/395.43
(58) Field of Search ................................ 370/229–235, 370/395, 432, 468, 412, 537, 538, 540, 395.43, 395.21

(56) References Cited

U.S. PATENT DOCUMENTS

| | | | | |
|---|---|---|---|---|
| 5,463,620 A | * | 10/1995 | Sriram | 370/229 |
| 5,521,971 A | | 5/1996 | Key et al. | 379/220 |
| 5,696,764 A | | 12/1997 | Soumiya et al. | 370/395 |
| 5,917,804 A | * | 6/1999 | Shah et al. | 370/230 |
| 6,046,981 A | * | 4/2000 | Ramamurthy et al. | 370/232 |
| 6,052,384 A | * | 4/2000 | Huang et al. | 370/468 |
| 6,084,955 A | * | 6/2000 | Key et al. | 379/220 |
| 6,195,354 B1 | * | 2/2001 | Skalecki et al. | 370/232 |
| 6,198,730 B1 | * | 3/2001 | Hogberg et al. | 370/320 |
| 6,240,066 B1 | * | 5/2001 | Nagarajan et al. | 370/230 |

OTHER PUBLICATIONS

S. Gringeri et al., Traffic Shaping, Bandwidth Allocation, and Quality Assessment for MPEG Video Distribution over Broadband Networks, IEEE Network, Nov./Dec. 1998, pp. 94–107.

T. Kwok, ATM the New Paradigm for Internet, Intranet and Residential Broadband Services and Applications, Prentice Hall, 1998, Sect. 11.2.1, pp. 239–240.

* cited by examiner

*Primary Examiner*—Chau Nguyen
*Assistant Examiner*—Soon-Dong Hyun
(74) *Attorney, Agent, or Firm*—Leonard Charles Suchyta; James K. Weixel

(57) ABSTRACT

The invention provides a method for managing the resources of a network so that a data signal can be carried more efficiently over the network. Generally, the methods of the invention include the steps of identifying a link in the network over which the data signal can be carried, determining whether the data signal can be carried over the link as a part of a multiplexed signal, comparing network resource requirements for delivering the data signal as part of a multiplexed signal with network resource requirements for delivering the data signal directly, and allocating network resources for the data signal as a result of the comparison.

25 Claims, 5 Drawing Sheets

SYSTEMS AND METHODS FOR TRANSPORTING ASSOCIATED DATA SIGNALS OVER A NETWORK

FIELD OF THE INVENTION

The invention relates to systems and methods for transporting associated data signals over a network, and more specifically to systems and methods that manage network resources by comparing characteristics of multiplexed and non-multiplexed data traffic.

BACKGROUND OF THE INVENTION

Data networks are complex systems. Each data network can comprise thousands of nodes each of which can send and receive data. Accordingly, at any given time a data network can be simultaneously transporting many data signals between the various nodes of the network. To manage this data traffic, the network must constantly manage its resources. Specifically, network resources must be allocated by the network in a manner that ensures that the network can provide the necessary resources, such as available buffer memory, available link bandwidth, and other such resources, that are needed to support a connection, or route, between two or more nodes on the network.

Additionally, network resources must constantly be managed so that each of the many data signals being transported across the network have a sufficient service quality. For example, video data traffic must be managed by the network so that it is delivered from the source to the user in real time thereby allowing the user to view the video without sporadic interruptions that can arise when data delivery through the network is delayed for an unacceptable period of time. Therefore, as can be seen from above, a network must constantly manage the data traffic on the network. The act of managing the data traffic includes making sure that the flow of data traffic across the network occurs on path that has sufficient resources to support that data traffic flow. For example, the network must manage its resources such as its memory buffers, link bandwidth, address spaces, and other network resources to make sure that the data being routed from a source to a user can be delivered across the selected path and can be done so with an acceptable quality of service.

To address the issue of network management, network engineers generally address two problem domains. A first problem domain involves reducing the amount of data traffic that occurs across the network. A typical approach for reducing the scale of data traffic is to compress data signals from a large format into a smaller format thereby reducing the actual amount of data that needs to be transferred in order to send a data signal from one point to another. One technique involves compressing a data signal to generate a new data signal that has the same, or similar information content within that signal but can be represented with fewer data bits. Although data compression can work quite well for reducing the size of data signals that have to be transferred across the network, compressed digital signals are however often more inherently complex to transfer. This complexity arises from the fact that a compressed digital signal has an inherently variable bit rate. For example, a compressed digital video signal has a variable bit rate as the complexity and motion content of that digital video signal affects the compression process, allowing certain portions of the video signal to be more greatly compressed than other portions. The differences in compression result in different bit rates for certain portions of the video signal. Thus, a compressed video signal can have a substantially varying bit rate during the time of the data transfer. Although compressing a signal, such as a video data signal, can reduce the amount of the traffic that has to be transferred across the network, the compression technique creates a variable bit rate data signal thereby making it more difficult for the network to manage its resources to make sure that the proper resources are always available for supporting the variable bit rate signal, even when the variable bit rate signal is transferring at its peak rate, which can be substantially greater than the average bit rate for that signal.

To further shape traffic for efficient delivery, some networks employ multiplexing systems that can multiplex a plurality of variable bit rate signals to form a composite bit rate signal that has certain traffic characteristics, such as an average bit rate, and a predictable peak rate below a certain predetermined criteria. Such a composite signal can allow for the transfer of multiple variable bit-rate (VBR) signals in a manner that requires less network resources than would be required for transporting each of the data signals independently.

The second problem domain addressed by network engineers involves making network management systems that manage and allocate network resources more efficiently. This type of traffic control system is capable of analyzing the traffic on the data network, and making decisions based on the characteristics of this traffic as to how the data should be transferred so that the network can carry more data for the users while meeting quality of service (QoS) requirements.

Network resource management typically involves allocating resources so that the network provides the necessary buffering and link bandwidth that is needed to support a connection, or route, and its associated service quality, which is typically measured by bounded throughput, delay and loss. The network management system makes decisions on whether to admit the connections or whether to reserve resources, and other decisions each of which is based on a description of the traffic and an assessment of the available network resources at a given time. For example, the network resource management system can respond to a user's request for the transport of a data signal by analyzing the traffic on the network to determine if the network has sufficient resources to support this new connection. Only if the network resource management system determines that such resources are available will it accept the user's connection request.

To make its decision the network resource management system analyzes a description of the source traffic as well as a description of the required QoS. For networks that carry multiplexed groupings of associated VBR signals, the network management system must first demultiplex with the composite signal, or through some other means get information that is representative of the traffic characteristics of the individual signals in the composite signal to make the admission and resource allocation decisions. This often requires the cumbersome step of separating or demultiplexing the composite video signal into its individual sources to determine the known traffic characteristics for each of these individual sources. The network resource management system employs the traffic characteristics of the individual sources to determine whether the network can support carrying the new data signal requested by the user.

Although multiplexed VBR signals can add to a reduction in the amount of resources required by a network to transport traffic across the network, existing network resource management systems make routing decisions based on the traffic characteristics of individual signals. Accordingly, systems demultiplex the composite VBR signal to determine characteristics of the associated independent VBR signals. Therefore, network resource management is done based on the network characteristics of the independent signals and not the composite VBR signal. Accordingly, there is a need in the art for a network resource management system that can make resource management decisions based on the traffic characteristics of multiplexed VBR signals.

SUMMARY OF THE INVENTION

The invention provides methods for managing resources of a network so that data signals can be carried more efficiently. More particularly, a link in a network over which a data signal can be carried is identified, and it is determined whether the data signal can be carried over the link as a part of a multiplexed signal. Network resources for delivering the data signal as part of a multiplexed signal are compared with network resources for delivering the data signal as a separate signal. Admit decisions and network resource allocation decisions are made based on the result of this comparison.

More particularly, in one embodiment, the invention provides methods for carrying a data signal over a network. These methods may operate by identifying a link in the network over which the data signal can be carried, determining whether the data signal can be carried over the link as a part of a multiplexed signal, comparing network resource demands for delivering the data signal as part of a multiplexed signal with network resource demands for delivering the data signal directly, and allocating network resources for the data signal as a result of the comparison. The comparison of resource demands may involve comparing a plurality of different factors including buffer occupancy, and link bandwidth utilization. Similarly, these methods may compare network resources for maintaining or achieving desired efficiencies in resource utilization. Additionally, these methods may compare network resources for achieving or maintaining desired criteria of service quality, and to this end may include comparing network resources to a set of threshold criteria for achieving selected service quality and selected bandwidth utilization.

To implement a decision as to how a data signal is to be carried over the network, methods described herein provide a multiplexed signal by multiplexing the data signal being admitted to the network with another signal or signals already being carried by the network. In other embodiments, the process performs a link by link analysis of the network resources that would be allocated for delivering a requested signal. Thus, for a multi-link path, the methods described herein may analyze and compare network resource demands for each link in a path, as well as the resource demands for an entire path. Accordingly, it will be understood that the methods described herein can include selecting between multiple possible paths across a network based on a comparison of resources allocated for delivering the requested signal as an independent or as part of a multiplexed signal.

Methods described herein may be used to identify a data path and for the data path identified, to determine whether a data signal can be associated with a multiplexed signal being carried over a network. If so, other data signals in the multiplexed signal may be identified, and network resources for delivering the data signal as part of the multiplexed signal may be compared with delivering the data signal and the other data signals in the multiplexed signal independently of one another over the network.

In a further aspect, the invention can be realized as a data network for transferring a data signal. Such data network systems may include a first node and a second node, at least one link connecting the first and second nodes and capable of transferring the data signal there between, and a comparator capable of comparing network resource demands for delivering the data signal across the link as part of a multiplexed signal with network resource demands for delivering the data signal directly across the link. The comparator may be configured for comparing network resources to provide efficiencies in resource utilization, as well as being configured for comparing network resources representative of quality of service. The comparator may compare network resources for each link in each path identified by a path identifier, to select a path for delivering the data signal.

DESCRIPTION OF THE ILLUSTRATED EMBODIMENTS

The foregoing and other objects and advantages of the invention will be appreciated more fully from the following further description thereof, with reference to the accompanying drawings wherein.

Figure 5:
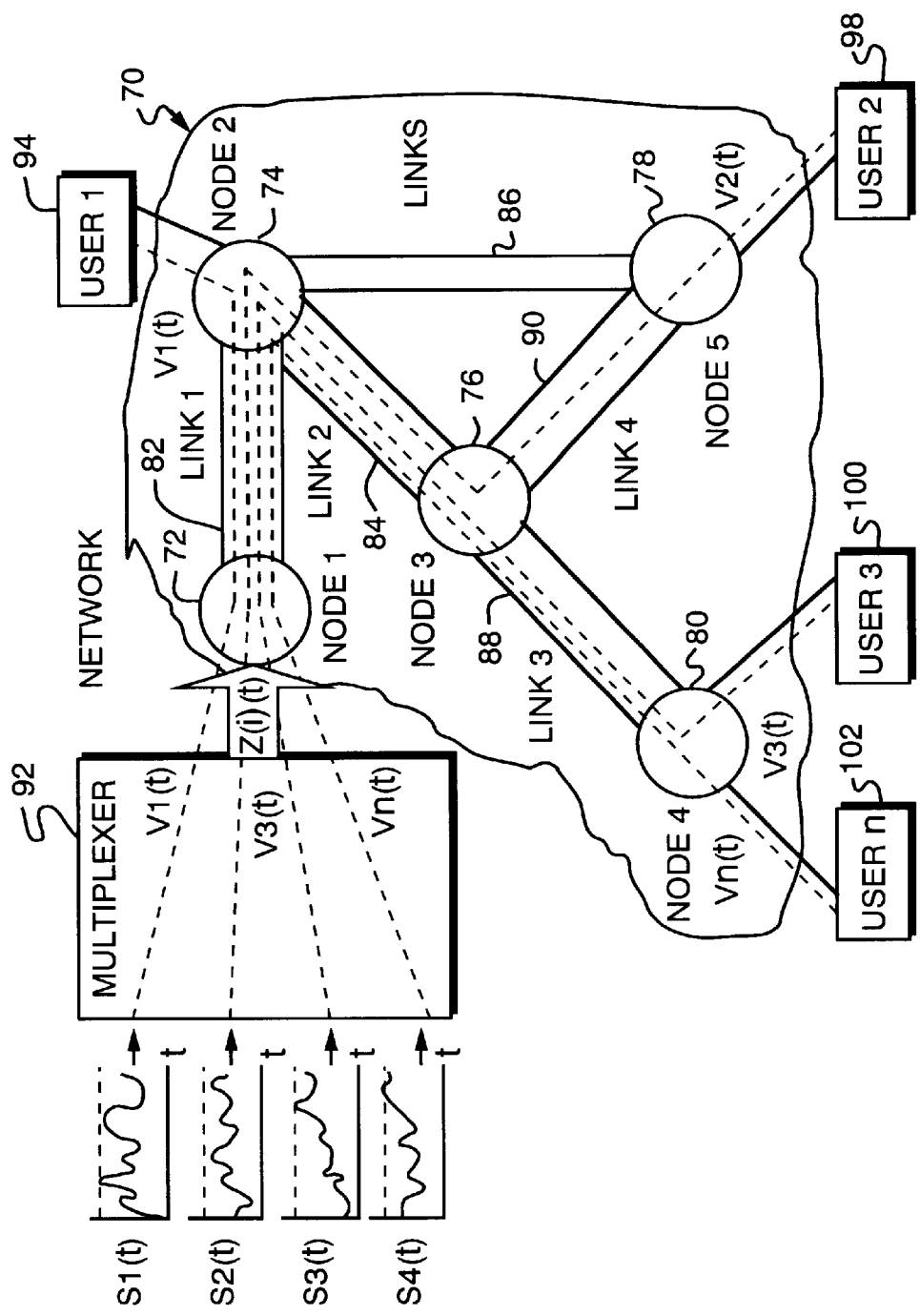
Figure 6:
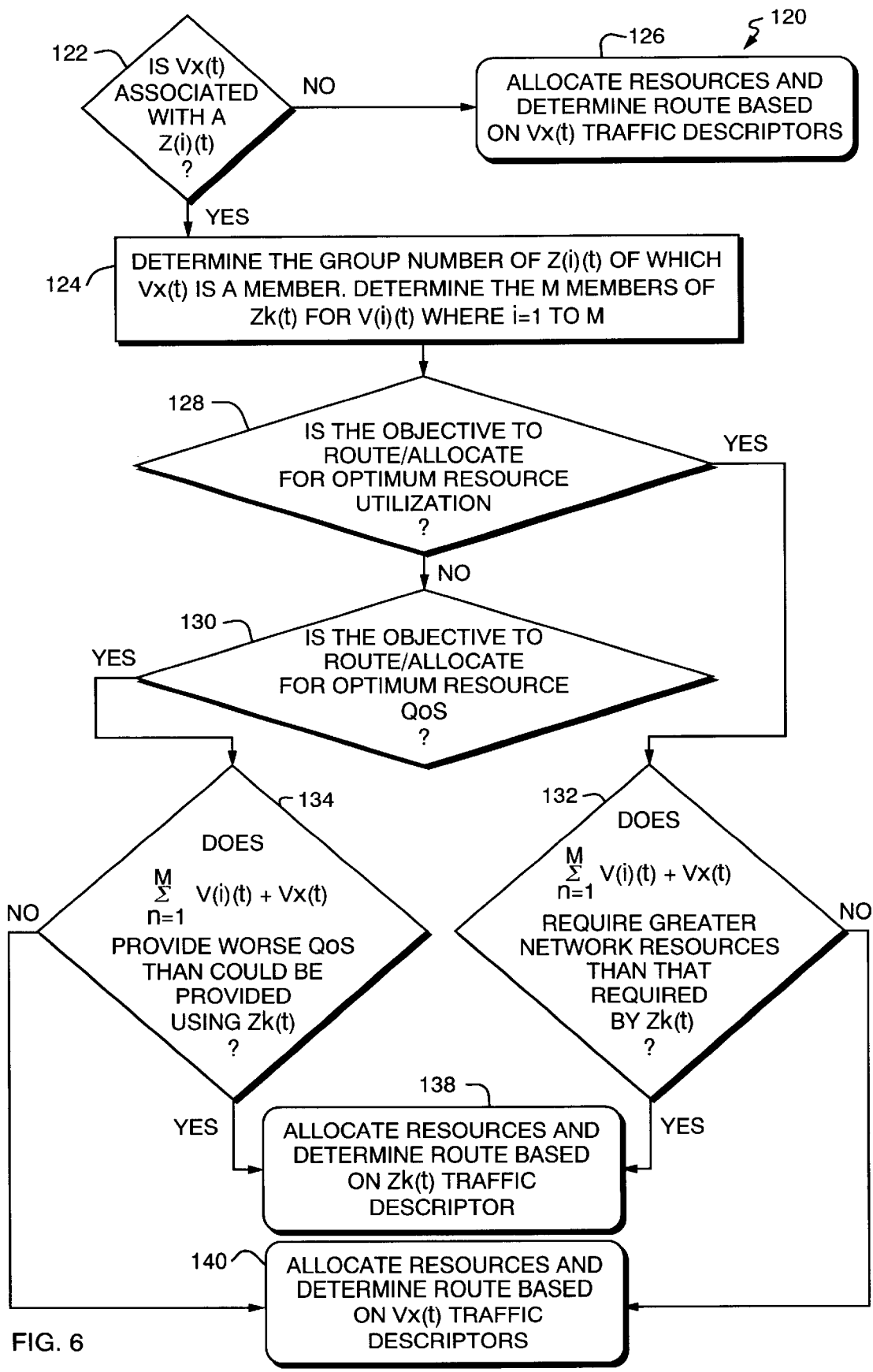

FIG. 5 is a functional block diagram depicts in more detail a network management system for analyzing the traffic characteristics of a multiplexed signal for allocating resources on a network; and FIG. 6 is a flow chart diagram which depicts one network management process for comparing traffic characteristics of a multiplexed VBR signal with the traffic characteristics of the individual VBR signals.

DETAILED DESCRIPTION OF THE ILLUSTRATED EMBODIMENTS

To provide an overall understanding of the invention, certain illustrative embodiments will now be described, including a resource management system that compares network resource demands for delivering data signal as part of a multiplexed data signal, or for delivering the data signal independently of other signals being carried over the network. However, it will be understood by one of ordinary skill in the art that the systems and methods described herein can be adapted and modified for other suitable applications and that such other additions and modifications will not depart from the scope hereof.

Figure 1:
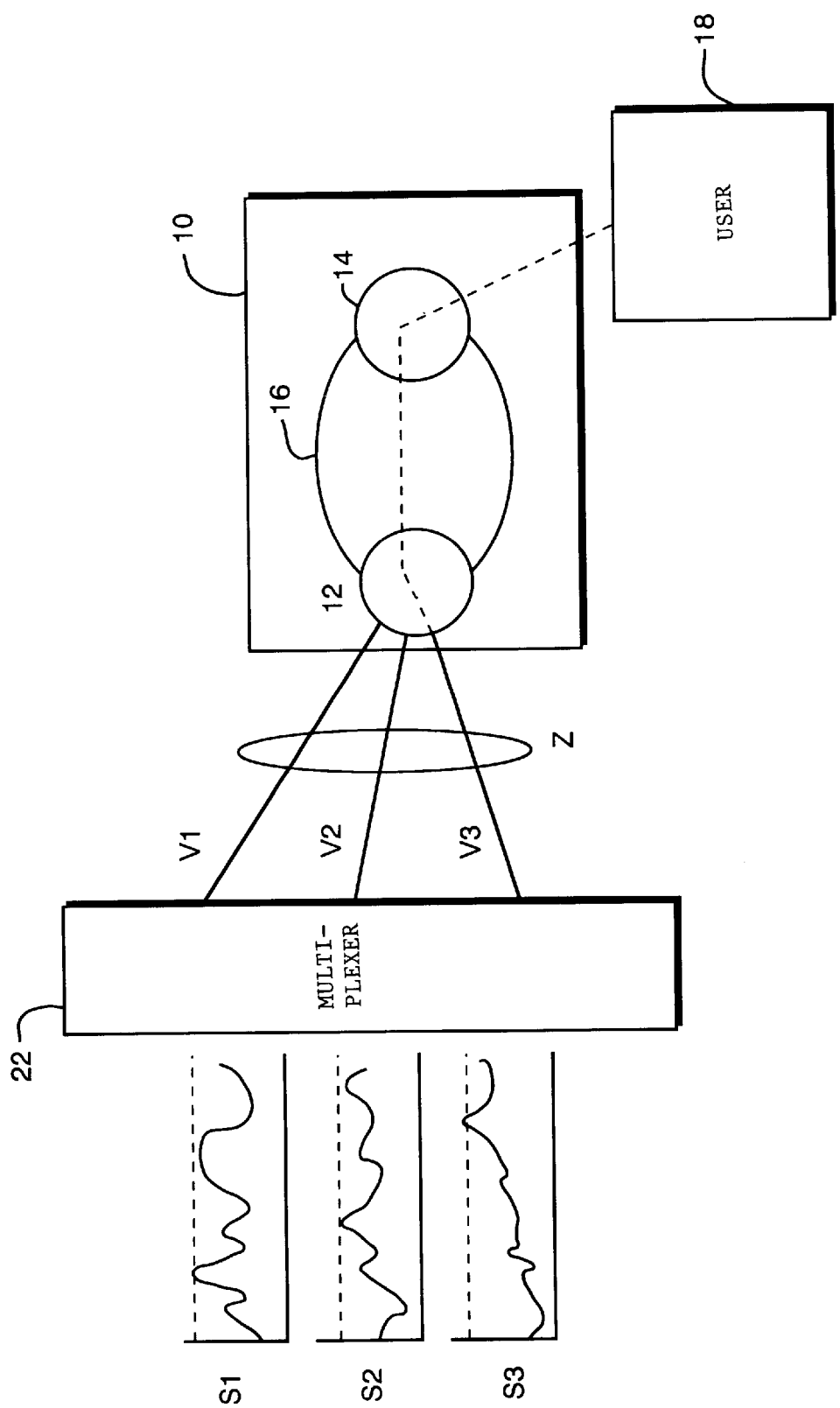
FIG. 1 is a functional black diagram which depicts one embodiment of a network capable of transporting a plurality of data signals.

FIG. 1 depicts generally one network 10 that performs admission and allocation decisions by comparing the resource demands for carrying a requested signal as part of a composite signal, Z, or by carrying the signal independently. This is represented pictorially in FIG. 1 by showing that a set of incoming signals S1, S2 and S3 coming from a set of signal sources can be presented to the depicted network system 10 either as a composite data signal Z or as a plurality of independent signals V1, V2 and V3.

Figure 2:
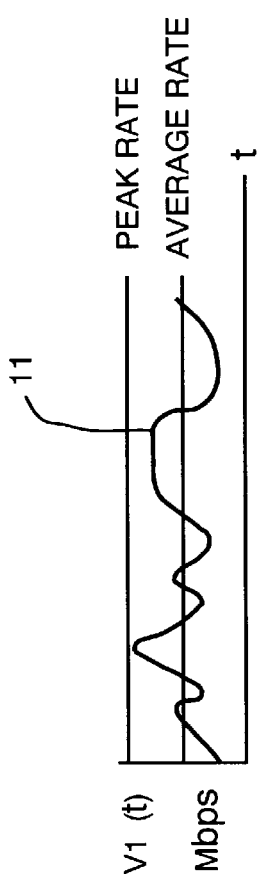
FIG. 2 depicts pictorially a variable bit rate signal.

The depicted signals V1, V2, and V3 may be variable bit rate signals that can carry video data, audio data, or any other type of data that can be formatted for delivery over a network. The data may be carried as bitstream data, data packets, cells or in any other suitable format. These variable bit rate signals can be generated by processing a continuous bit rate signal, and for example can be generated by a compression process that operates to reduce the number of bits that needs to be sent across the network. Other processes, such as variable length coding can also be applied to generate a variable bit rate signal. One such variable bit rate signal is depicted in FIG. 2. The resources that the network 10 will allocate for carrying a variable bit rate signal, turn in part on the characteristics, such as peak bit rate, of that signal.

Specifically, FIG. 2 presents a variable bit rate signal 11 plotted across a set of axes that depict the rate (bits/second) at which bits are being transferred over the duration of the signal. As shown in FIG. 2, a variable bit rate signal 11 can be described, at least in part, by its bit rate characteristics, such as its average bit rate and its peak bit rate. Such characteristics are examples of traffic characteristics that can be analyzed by the network 10 for determining resource allocations for delivering the signal 11.

Figure 3:
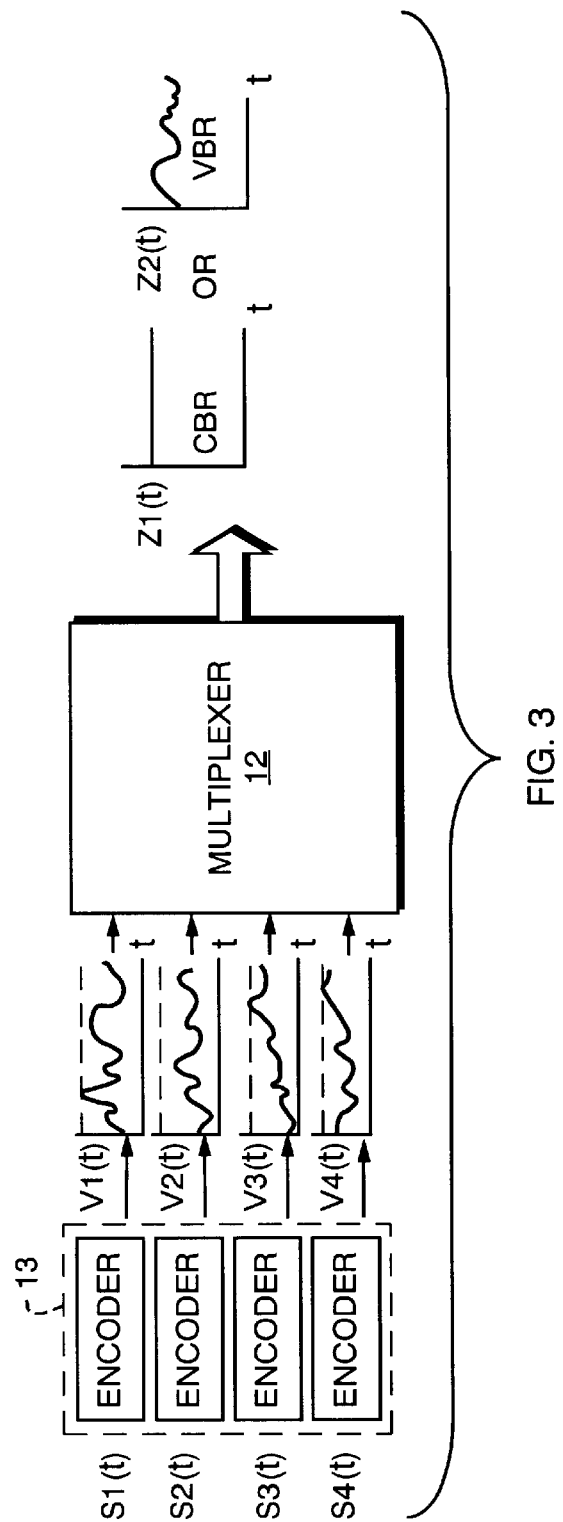
FIG. 3 is a functional block diagram which depicts a multiplexer system capable of processing a plurality of VBR signals to generate a composite VBR or CBR signal.

FIG. 3 depicts a multiplexor 12 that can be similar to the multiplexor 22 of FIG. 1. As shown in FIG. 3, the multiplexor 12 can multiplex between a plurality of variable bit rate signals to produce a single, aggregate signal Z. The multiplexor 12 can generate a signal Z that has a constant bit rate or a variable bit rate. To this end, the multiplexor 12 can employ feedback control over the encoding process to achieve the desired bit rate characteristics for the aggregate signal Z.

The network 10 depicted in FIG. 1 will analyze and compare the traffic characteristics of the composite source signal Z as well as the traffic characteristics of each of the individual signals V1, V2 and V3. The network 10 will then make admission and allocation decisions based on the comparison of the resources required or desired to carry the data signals as either a composite signal or as separate independent signals, or a combination of composite signals and independent signals. By allowing the network 10 to select between these different options, a more efficient use of network resources can be achieved.

More specifically, FIG. 1 depicts a network 10 that includes node elements 12 and 14 connected by a link 16. Further depicted in FIG. 1 is a user station 18 that can couple to one of the nodes 14 within the network 10. For purpose of clarity, the network 10 and the processes employed thereby will be described with reference to the delivery of a video signal from a video source to the user 18 depicted in FIG. 1. To this end, the depicted data signal V3 will be understood as a video signal that can be transmitted from a video source to the user in response to a user's request for a video channel. However, it will be apparent to those of skill in the art that the data signal can comprise audio, video, text, whiteboard, binary or any other data. In this example, the network 10 can be actively carrying signals V1 and V2. In response to the user request to receive the data signal V3 from another video source, the network 10 can begin the process of admitting and allocating network resources for carrying the newly requested signal V3 in addition to the two previously carried signals V1 and V2. To that end, the network 10 can collect traffic characteristic information, as described above, for the individual video signals V1 through V3 and for the composite multiplexed signal Z, which in this example would comprise the data from signals V1, V2 and V3. The network 10 can analyze the data traffic characteristics to determine whether the network has sufficient resources to admit the new signal V3. If such resources are available, the network 10 can employ the data traffic characteristic information for determining the resources necessary, desired or sufficient, to carry the new signal V3 along with the additional traffic of V1 and V2.

In this example, the network resources being managed by the system can include buffer space, link bandwidth, address space, services, devices and any of the other common resources employed by a network for carrying traffic between one node and another. The type of resources managed by the systems described herein will turn, in part, on the type of the network and the devices and services available to network clients and users. Thus it will be understood to those of skill in the art, that the list of resources managed and compared by the systems described herein is extendable, and in no way limited to any particular group of resources specifically identified herein.

In the embodiment depicted in FIG. 1, the network 10 can be a conventional computer network, such as an ATM network, an IP network, or any other type of data network suitable for carrying information from one location or device to another. The network 10 can comprise any suitable network topology including a star or bus topology and can follow any protocol, including connectionless protocols. The network can be wired, wireless, cellular or fiber. It can be a local area network, or a wide area network and can be employed for carrying data between work stations or voice signals between communication stations. The nodes 12 and 14 can be any active devices that are connected to the network, such as a computer workstation, a communication device, a printer, a hub, a switch or a router. The depicted nodes 12 and 14 are coupled together by a link 16 that can comprise a physical connection medium such as a coaxial cable, an RF link, optical fiber, or a metallic wire pair.

Additionally, the network 10 includes a network resource management system. The network resource management system may be a software program or tool that manages the environment of the network. To this end, the network resource management system may have the capability of locating, allocating and delivering resources or services while respecting certain policy requirements for load balancing, packet scheduling, optimal use of resources, and quality of service (QoS), which may include measures of packet or cell loss and delay variation.

FIG. 1 further depicts a multiplexer element 22. The multiplexer element 22 is capable of processing the signals S1, S2, and S3 and generating therefrom a composite signal Z and the individual signals V1, V2, and V3. The depicted multiplexor 22 can be of the type manufactured and sold by the DIVICOM Company, such as the MV40 and MN20 systems which can include as part of the device, an encoder for encoding a signal into a format more suitable for delivery across the network 10.

The depicted multiplexor 22 can process the VBR video signals V1–V3, to create the composite signal Z. The signal Z can be a variable bit-rate (VBR) or constant bit-rate (CBR) digital signal that replicates the content of the three individual signals V1, V2 and V3. FIG. 2 is an illustration of a compressed digital video signal 11, V1 (t). Such a signal 11 can be described by several traffic characteristics, sometimes called traffic descriptors. The signal 11 will have an instantaneous maximum rate that is the peak rate and will have a long time average rate, which can be understood as, for example the average rate over the length of the movie. For an ATM network, the traffic may also be described by ATM parameters such as Peak Cell Rate (PCR), Sustainable Cell Rate (SCR), and Maximum Burst Size (MBS). Additionally, the multiplexor 22 can control how the composite signal Z is generated, and specifically can control the multiplexing and/or encoding process so that the signal Z will have VBR or CBR traffic characteristics, such as peak and average rates, that fall within a predetermined range.

The operation of the multiplexor 22 is depicted in FIG. 3 which shows such a system, wherein the multiplexor 22 multiplexes a plurality of VBR signals to generate a composite or aggregate signal, Z, with desired characteristics. These traffic characteristics can be provided to the network resource management system for use by the resource management system in making admission and allocation determinations. Similarly, the traffic characteristics of the individual video sources, Vn(t), can be provided by the video encoding system to the network. Any suitable method can be employed for delivering this information to the network resource management system, including real-time and non-real-time methods, such as by communicating the information by a network signaling function, or by having the information provisioned, i.e., by having information transferred by a non-real-time process, such as by way of network management protocols, such as SNMP.

Figure 4:
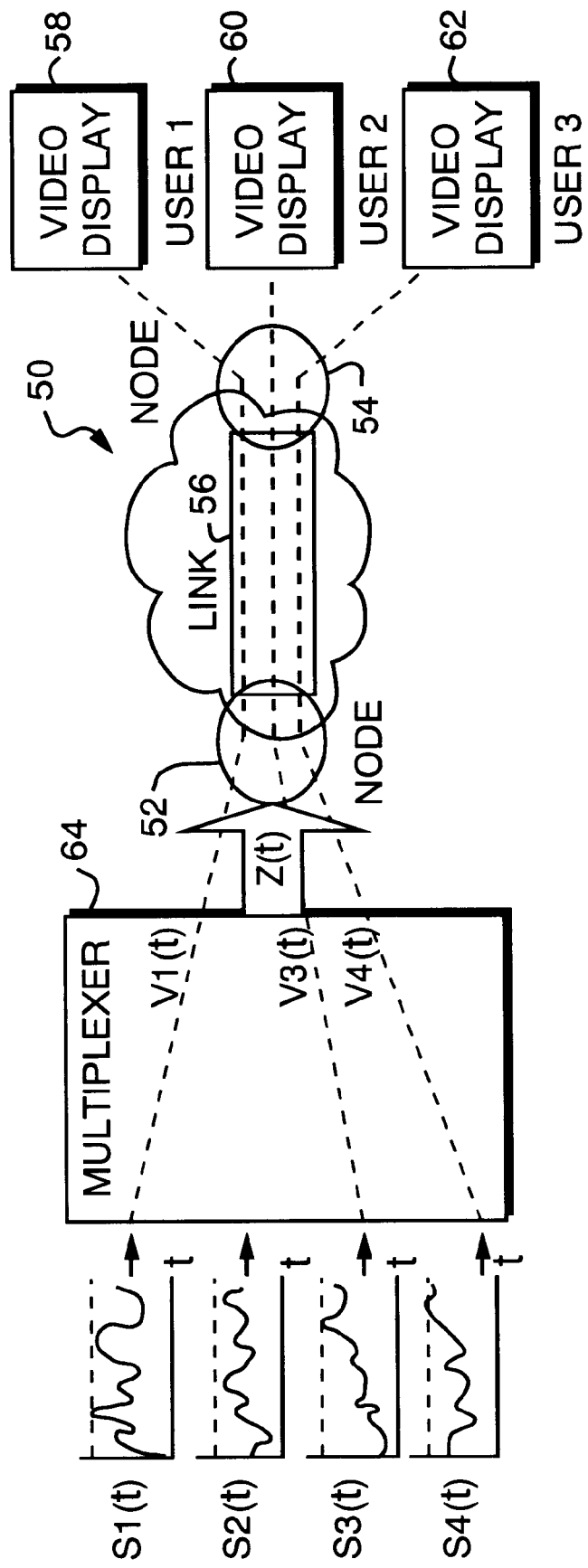
FIG. 4 is a functional block diagram which depicts pictorially the transfer of a plurality of VBR signals as a composite multiplexed signal across one link of a network.

The traffic characteristic information can be employed by the network for making admission and allocation determinations. Such a process and a system that employs such a process is depicted in FIG. 4. Specifically, FIG. 4 depicts a network 50 that comprises two nodes 52 and 54 and a connecting link 56. A plurality of video displays 58 through 62 for users 1, 2 and 3 respectively, couple to the node 54, as endpoints for the video signals being carried by the network 50 and being provided by the multiplexor 64. In operation, as a user requests video channels, the network 50 establishes a connection, or route, between the multiplexer 64 and each video display 58–62. To determine if the network 50 can establish the user's connection, the network 50 makes an assessment of the available network resources. For the system of FIG. 4, user 1 and user 2 have connections to video source V1(t) and V3(t) respectively and the network 50 has allocated resources to provide these users with the required QoS. When User 3 requests video source V4(t) the network 50 examines the state of the current resource allocations. For example, the network resource management system for the network 50 examines the buffer utilization in the nodes 52 and 54 and utilization of the link 56. In the illustration of FIG. 4, there is only one link, however in systems with multiple links, the network resource management system can make a similar assessment for each link in the route. If the network 50 determines that using the composite traffic description of Z(t) provided by the multiplexor 64 will provide better QoS or resource utilization, then the network 50 will use Z(t) traffic descriptors to establish the connection between User 3 and video source V4(t). However if there is no benefit, the network 50 can admit and allocate based on the individual traffic characteristics of V4(t). Therefore resources including buffering and link bandwidth can be allocated for a Z(t) path composed of V1, V3, and V4.

For purpose of further illustrating the operation and structure of the system depicted in FIG. 4, the following examples are presented. These examples will be understood by those of skill in the art as representative of the types of comparisons that may be made by the systems and processes described herein and are not to be understood as limiting in any way.

EXAMPLE 1

In a first example, the VBR sources V1(t), V3(t), and V4(t) can have peak rates of 3, 6, 8 Mbps respectively and the video encoding process implemented through the multiplexor 64 can have the objective of producing a CBR Z(t) output with a peak rate of 12 Mbps. As part of the admission process, the network 50 determines that there is 9 Mbps of the link bandwidth allocated for carrying V1(t) and V3(t) across the link 56. To admit V4(t) the network 50 could allocate a total of 17 Mbps of link bandwidth for the three-video sources or use the peak rate of Z(t) that is 12 Mbps. The network 50 will provide the same QoS to all users by using 12 Mbps as the encoding process has already dynamically allocated quality to achieve the 12 Mbps.

EXAMPLE 2

As another example, the network 50 can apply an effective bandwidth metric for determining the desired format for delivering a signal over the network. To this end, the effective bandwidth (EBW) or equivalent capacity can be defined as the amount of link capacity or transmission bandwidth needed to serve a traffic source with the objective to satisfy a pre-specified cell loss probability and delay variation criteria. For this effective-bandwidth example, VBR sources V1(t), V3(t), and V4(t) have effective bandwidths of 3, 6, 8 Mbps respectively and a cell loss probability (CLP) of 10 exp−6. The video encoding process has an objective of producing a VBR Z(t) output with an effective bandwidth of 12 Mbps a cell loss probability of 10 exp−9.

User 1 and User 2 have connections to video source V1(t) and V3(t) respectively and the network 50 has allocated resources to provide these users with the required QoS (CLP of 10 exp−6) using their effective bandwidth. When User 3 requests video source V4(t) the network 50 examines the state of the current resource allocations. The buffer utilization in the nodes and utilization of the links are examined. In the network 50 of FIG. 4, there is only one link, the link 56. As part of the admission process the network 50 determines that there is 9 Mbps of the link bandwidth allocated for V1(t) and V3(t). To admit V4(t) the network 50 could allocate a total of 17 Mbps of link bandwidth for the three-video sources or use the effective bandwidth of Z(t) that is 12 Mbps. The network 50 will provide a lower CLP to all users by using 12 Mbps because the encoding process has already dynamically allocated video quality to achieve the 12 Mbps effective bandwidth with a CLP of 10 exp−9.

Turning now to FIG. 5, an embodiment of a system according to the invention wherein the network includes a plurality of nodes and links is depicted. Specifically, FIG. 5 depicts a network 70 that includes a plurality of nodes, 72–80 and a plurality of links 82–90 that connect the users 94–102 and the multiplexer 92, thereby allowing data signals to be transferred between the users and the video sources coupled to the multiplexer 92. Again, as discussed above, the network can be employed for delivering video signals to a user, however, it will be understood that other types of data signals can be managed by the systems and methods described herein.

For the depicted multi-link network 70, the network resource management system employed by the network 70 can make admission and allocation decisions based on a link by link analysis of the route or routes selected for delivering the video signal to the requesting user. For example, in a preliminary step the network resource. management system can make an assessment whether a user's request to receive a new video signal over the network 70 can be granted. To this end, the network 70 determines whether there is a path, or route, across the multiple links of the network 70 that has sufficient resources to carry the requested video signal with the requested QoS. The network resource management system makes this determination by executing a process that compares the network resources required or desired for delivering the requested signal as part of a multiplexed signal or as an independent signal.

One process for making this determination is depicted in FIG. 6, which provides a flowchart representation of an exemplary process 120. The network resource management system can initiate this process 120 in response to a user request for the delivery of a signal Vx(t). As depicted, the process 120 can begin in a first step 122 wherein the network 70 first determines if Vx(t) is a member of an associated group, Z(i)(t). If there is no association then conventional techniques are used to deliver the information.

Alternatively, if Vx(t) is associated with a group, then the group is to be identified, and the process 120 proceeds to step 124. The process 120 identifies the group by a group number where there are J associated groups Z(i)(t) for i equal to 1 to J. Let Zk(t) be one of the J associated groups Z(i)(t) that are connected to the network and Vx(t) is one of the associated signals in Zk(t).

For a given Z(i)(t) there are 1 to N multiplexed signals V(n)(t). As route and resource allocations decisions are made, in this practice, for each link in the network 70, this process, as illustrated in the flowchart, is performed on a link-by-link basis to determine the desired, or optimal, route and allocate resources for that route. For each link, the network 70 determines which of the V(n)(t) signals in Zk(t) are carried over that link on established connections or routes. There are 1 to N signals in the associated group Zk(t) forming a set of N signals. For each link there is a subset of M members of the set of N signals carried over the link. This set is defined as V(i)(t) for i equal to 1 to M and M less than or equal to N. There is a mapping of the two sets of signals independent of the index notation and dependent on which signals are carried over established connections or routes. For example V(n)(t) where n=2 may be the lowest index of V(n)(t) carried over a specific link and therefore V(1)(t) is the signal V(2)(t).

For the process 120, at the administrator's option one of two overall objectives may be used by the network 70 to deliver the signals of the associated group Zk(t). First, the administrator may choose to optimize the use of network resources; i.e., wherein greatest bandwidth efficiency and buffer utilization are achieved. Second, the objective may be to optimize service quality to all users of Zk(t). As a result of routing and allocation decisions to achieve either of these two objectives, any one link may have required lesser network resources or provide better QoS. Also, the objective can be set dynamically by information provided by the user in the request for the information such as a user-acceptable video quality that defines the minimum bit-rate for delivery.

In a further alternative practice, algorithms that combine these link-level decisions may be applied that use the techniques embodied in this invention to achieve some user defined overall system objective. This user defined objective may weigh quality and resource allocation in some manner other than the binary decision in the flowchart of FIG. 6.

As shown in FIG. 6, if the selected objective is to allocate the least bandwidth and buffering needed for the requested service quality, then the process 120 proceeds to step 132 and the network 70 determines what resources are needed to carry Vx(t) along with the established M signals on that specific link. Also the network 70 determines (or has determined) the resources that are to be allocated to carry Zk(t) on that specific link. The determinations are based traffic descriptions of all signals, V(i)(t), Zk(t). Resources are allocated using Zk(t) if less are needed as compared to using Vx(t) plus V(i)(t) for i=1 to M.

Alternatively, if the objective is to allocate bandwidth and buffering to improve service quality, then the process 120 proceeds to step 130 and the network 70 determines what resources are to be allocated to carry Vx(t) along with the established M signals on that specific link. Resources are allocated using Zk(t) if better quality (e.g., lower cell or packet loss) can be provided than the quality provided by an allocation based on Vx(t) plus V(i)(t) for i=1 to M.

If the network 70 allocated resources for a specific link using Zk(t), then the established connections or routes for members of Zk(t) will be represented by the traffic descriptions of Zk(t). The Zk(t) descriptors may be used for any and all resource decisions regarding this link.

The process depicted in FIG. 6 can be realized as a software component operating on a conventional data processing system such as a Unix workstation. In that embodiment, the process can be implemented as a C language computer program, or a computer program written in any high level language including C++, Fortran, Java or basic. Additionally, in an embedded system where microcontrollers or DSPs are employed for performing this process, the process may be realized as a computer program written in microcode or written in a high level language and compiled down to microcode that can be executed on the platform employed. The development of such computer programs follow from principles known to those of skill in the art, and such techniques are set forth in, for example, Stephen G. Kochan, Programming in C, Hayden Publishing (1983).

Those skilled in the art will know or be able to ascertain using no more than routine experimentation, many equivalents to the embodiments and practices described herein. It will also be understood that the systems described herein provide advantages over the prior art including the ability to more efficiently use network resources.

Accordingly, it will be understood that the invention is not to be limited to the embodiments disclosed herein, but is to be understood from the following claims, which are to be interpreted as broadly as allowed under the law.

I claim:

1. A method for carrying a data signal over a network, comprising
    identifying a link in the network over which the data signal can be carried,
    determining whether the data signal can be carried over the link as a part of an aggregate signal generated from a plurality of other data signals in the network,
    comparing network resources to be allocated for delivering the data signal as part of the aggregate signal with network resources to be allocated for delivering the data signal separately from the aggregate signal, and
    allocating network resources for the data signal as a result of the comparison.

2. A method according to claim 1 wherein comparing resources includes comparing resources selected from a group consisting of buffer occupancy and link bandwidth utilization.

3. A method according to claim 1, wherein comparing network resources includes comparing network resources for efficiencies in resource utilization.

4. A method according to claim 1, wherein comparing network resources includes comparing network resources for achieving desired criteria of service quality.

5. A method according to claim 1, wherein comparing network resources includes comparing network resources to a set of threshold criteria for meeting selected service quality and selected bandwidth utilization.

6. A method according to claim 1, further including transferring the data signal as part of a second multiplexed signal, wherein said second multiplexed signal is generated as a function of the data signal and the multiplexed signal.

7. A method according to claim 1, wherein identifying a link includes identifying a path having at least one link.

8. A method according to claim 7, wherein comparing network resources includes comparing network resources for each link in the path.

9. A method for carrying a data signal over a network, comprising identifying a data path for carrying the data signal, for the identified data path, determining whether the data signal can be associated with an aggregate signal generated from a plurality of other signals being carried over the network, and if so, identifying the plurality of signals in the aggregate signal, comparing network resources for delivering the data signal in association with the aggregate signal with network resources for delivering the data signal separately from the plurality of signals in the aggegate signal over the network.

10. A method according to claim 9, wherein comparing network resources includes comparing network resources for achieving efficiencies in resource utilization.

11. A method according to claim 9, wherein comparing network resources includes comparing network resources for achieving desired criteria of service quality.

12. A method according to claim 9, wherein comparing network resources includes comparing network resources to a set of threshold criteria representative of selected measures of service quality and bandwidth utilization.

13. A method according to claim 9, further including identifying a plurality of possible paths and selecting among the possible paths based on network resources to be allocated for the path.

14. A method for carrying a data signal over a network, comprising identifying a data path for carrying the data signal, for the identified data path, determining whether the data signal can be associated with an aggregate signal generated from a plurality of other signals being carried over the network, and if so, identifying the plurality of signals in the aggregate signal, and comparing network resources for delivering the data signal in association with the aggregate signal with network resources for delivering the data signal separately from the plurality of signals in the aggregate signal over the network, wherein comparing network resource requirements includes performing a comparison for each link of the path and comparing the network resource requirements using a combination of efficiency and quality of service metrics.

15. A data network for transferring a data signal, comprising a first node and a second node, at least one link connecting the first and second nodes and capable of transferring the data signal therebetween, and a comparator capable of comparing network resources for delivering the data signal across the link as part of an aggregate signal formed from a plurality of other signals in the network with network resources for delivering the data signal separately from the aggregate signal across the link.

16. A data network according to claim 15, wherein the comparator includes means for comparing network resources representative of efficiencies in resource utilization.

17. A data network according to claim 15, wherein the comparator includes means for comparing network resources representative of quality of service.

18. A data network according to claim 15, further including a path identifier for identifying a plurality of paths, each comprising one or more links that interconnect the nodes.

19. A data network for transferring a data signal, comprising a first node and a second node, at least one link connecting the first and second nodes and capable of transferring the data signal therebetween, a path identifier for identifying a plurality of paths, each comprising one or more links that interconnect the nodes, and a comparator capable of comparing network resource requirements for delivering the data signal across the link as part of an aggregate signal formed from a plurality of other signals in the network with network resource requirements for delivering the data signal separately from the aggregate signal across the link, wherein the comparator includes means for comparing network resources for each link in each path identified by the path identifier, to select one path for delivering the data signal.

20. A data network according to claim 18, further comprising an encoder capable of processing a bitstream signal to generate a variable bit rate signal for transfer across the data network.

21. A data network according to claim 18, further comprising an encoder and multiplexer capable of processing a plurality of bitstream signals to generate a multiplexed signal for transfer across the data network.

22. A data network according to claim 18, further comprising an encoder and multiplexer capable of processing a plurality of data packet signals to generate a multiplex of variable bit rate signals for transfer across the data network.

23. A data network according to claim 18, further comprising an encoder capable of processing a plurality of ATM signals to generate a multiplex of variable bit rate-signals for transfer across the data network.

24. A method according to claim 9, wherein the step of comparing network resource requirements includes performing a comparison for each link of the path and comparing the network resource requirements using a combination of efficiency and quality of service metrics.

25. A data network according to claim 18, wherein the comparator includes means for comparing network resources for each link in each path identified by the path identifier, to select one path for delivering the data signal.

* * * * *